US011636879B2

(12) United States Patent
Wang et al.

(10) Patent No.: US 11,636,879 B2
(45) Date of Patent: Apr. 25, 2023

(54) VIDEO GENERATING METHOD, APPARATUS, ELECTRONIC DEVICE, AND COMPUTER-READABLE MEDIUM

(71) Applicant: BEIJING BYTEDANCE NETWORK TECHNOLOGY CO., LTD., Beijing (CN)

(72) Inventors: Ya Wang, Beijing (CN); Wei Jiang, Beijing (CN); Qifan Zheng, Beijing (CN); Pingfei Fu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/744,671

(22) Filed: May 14, 2022

(65) Prior Publication Data

US 2022/0277775 A1 Sep. 1, 2022

Related U.S. Application Data

(63) Continuation of application No. PCT/CN2020/129284, filed on Nov. 17, 2020.

(30) Foreign Application Priority Data

Nov. 18, 2019 (CN) .......................... 201911129727.9

(51) Int. Cl.
*G11B 27/036* (2006.01)
*G06F 16/783* (2019.01)
(Continued)

(52) U.S. Cl.
CPC ........ *G11B 27/036* (2013.01); *G06F 16/7834* (2019.01); *G11B 27/034* (2013.01); *G11B 27/34* (2013.01)

(58) Field of Classification Search
CPC ..... G11B 27/036; G11B 27/034; G11B 27/34; G06F 16/7834
See application file for complete search history.

(56) References Cited

U.S. PATENT DOCUMENTS

| 2008/0077866 A1 | 3/2008 | Margulis |
| 2011/0142420 A1 | 6/2011 | Singer |

(Continued)

FOREIGN PATENT DOCUMENTS

| CN | 105530440 A | 4/2016 |
| CN | 105933773 A | 9/2016 |

(Continued)

OTHER PUBLICATIONS

Zhan Junling; "System of Video Editing and Playing Based on Intermediate Files"; Xidian University; Thesis; Dec. 2015; 85 pages (English abstract see p. III and IV).

(Continued)

*Primary Examiner* — Girumsew Wendmagegn
(74) *Attorney, Agent, or Firm* — BakerHostetler

(57) ABSTRACT

A video generating method, an apparatus, an electronic device, and a computer-readable medium are provided. The method includes: acquiring a first video set and an audio material; determining a first music point of the audio material according to an amount of the video materials in the first video set; generating, according to a sorting order of the video materials in the first video set, one video clip for each first music clip in the audio material by respectively using one video material, so as to obtain a first video sequence; adjusting, in response to detecting an editing operation on the video clip in the first video sequence, the video clip in the first video sequence, so as to obtain a second video sequence; and splicing together video clips in the second (Continued)

video sequence, and adding the audio material as a video audio track to obtain a composite video.

20 Claims, 6 Drawing Sheets

(51) Int. Cl.
*G11B 27/034* (2006.01)
*G11B 27/34* (2006.01)

(56) References Cited

U.S. PATENT DOCUMENTS

| | | | |
|---|---|---|---|
| 2012/0195573 A1 | 8/2012 | Flint et al. | |
| 2012/0201518 A1 | 8/2012 | Singer | |
| 2013/0163963 A1* | 6/2013 | Crosland | G11B 27/34 386/E5.028 |
| 2014/0355960 A1 | 12/2014 | Paulus et al. | |
| 2015/0058709 A1 | 2/2015 | Zaletel | |
| 2016/0172000 A1 | 6/2016 | Ju et al. | |
| 2018/0286458 A1* | 10/2018 | Harron | G06F 16/438 |
| 2018/0295427 A1 | 10/2018 | Leiberman et al. | |
| 2019/0182565 A1 | 6/2019 | Hitching et al. | |

FOREIGN PATENT DOCUMENTS

| | | |
|---|---|---|
| CN | 105959579 A | 9/2016 |
| CN | 106992004 A | 7/2017 |
| CN | 107770626 A | 3/2018 |
| CN | 108419035 A | 8/2018 |
| CN | 109168084 A | 1/2019 |
| CN | 109275028 A | 1/2019 |
| CN | 109379643 A | 2/2019 |
| CN | 109660867 A | 4/2019 |
| CN | 110233976 A | 9/2019 |
| CN | 110265057 A | 9/2019 |
| CN | 110278388 A | 9/2019 |
| CN | 110336960 A | 10/2019 |
| EP | 4044611 A1 | 8/2022 |

OTHER PUBLICATIONS

International Patent Application No. PCT/CN2020/129284; Int'l Written Opinion and Search Report; dated Feb. 19, 2021; 7 pages.
European Patent Application No. 20889011.1; Extended Search Report; dated Oct. 28, 2022; 13 pages.
"Edit your video Clips"; https://support.apple.com/en-gb/guide/clips/devf7e94c16a/2.0.7/ios/13.0; Apple; ©2022;accesses Oct. 14, 2022; 2 pages.

* cited by examiner

VIDEO GENERATING METHOD, APPARATUS, ELECTRONIC DEVICE, AND COMPUTER-READABLE MEDIUM

The present application is a continuation of International Patent Application No. PCT/CN2020/129284, filed on Nov. 17, 2020, which claims priority of Chinese Patent Application No. 201911129727.9, filed on Nov. 18, 2019, and the entire content disclosed by the Chinese patent application is incorporated herein by reference as part of the present application.

TECHNICAL FIELD

Embodiments of the present disclosure relate to a field of computer technology, and more particularly, to a video generating method, an apparatus, an electronic device, and a computer-readable medium.

BACKGROUND

With rapid development of multimedia technology, video processing technology is also progressing at a fast pace, and more and more people transmit information or share life slices through videos. Meanwhile, video processing software has been widely applied to various scenarios as a common software on terminals. In many cases, users usually need to make a video with materials such as video and music.

However, at present, users usually need to spend a lot of energy and time to process various materials when using video software to edit videos. It can be seen that the current video editing mode is not simple enough for users.

SUMMARY

The contents of the disclosure is used to introduce concepts in a simplified form that are described in detail in the specific implements fallow. The contents of this disclosure is not intended to identify key features or essential features of the claimed technical solution, nor is it intended to be used to limit the scope of the claimed technical solution.

Some embodiments of the present disclosure provide a video generating method, an apparatus, an electronic device, and a computer-readable medium, so as to solve the technical problems as mentioned in the above background.

In a first aspect, some embodiments of the present disclosure provide a video generating method, and the method comprises: acquiring a first video set and an audio material, the first video set comprising a plurality of video materials; determining a first music point of the audio material according to an amount of the video materials in the first video set, where the first music point is used to divide the audio material into a plurality of first music clips, and an amount of the first music clips is same as the amount of the video materials in the first video set; generating, according to a sorting order of the video materials in the first video set, one video clip for each first music clip in the audio material by respectively using one video material, so as to obtain a first video sequence, where the first music clip and the video clip corresponding to each other have a same duration; adjusting, in response to detecting an editing operation on the video clip in the first video sequence, the video clip in the first video sequence, so as to obtain a second video sequence; and splicing together video clips in the second video sequence, and adding the audio material as a video audio track to obtain a composite video.

In a second aspect, some embodiments of the present disclosure provide an apparatus for generating a video, and the apparatus comprises: an acquiring unit, configured to acquire a first video set and an audio material, the first video set comprising a plurality of video materials; a determining unit, configured to determine a first music point of the audio material according to an amount of the video materials in the first video set, where the first music point is used to divide the audio material into a plurality of first music clips, and an amount of the first music clips is same as the amount of the video materials in the first video set; a generating unit, configured to generate, according to a sorting order of the video materials in the first video set, one video clip for each first music clip in the audio material by respectively using one video material, so as to obtain a first video sequence, where the first music clip and the video clip corresponding to each other have a same duration; an adjusting unit, configured to adjust, in response to detecting an editing operation on the video clip in the first video sequence, the video clip in the first video sequence, so as to obtain a second video sequence; and a splicing unit, configured to splice together video clips in the second video sequence, and add the audio material as a video audio track to obtain a composite video.

In a third aspect, some embodiments of the present disclosure provide an electronic device, and the electronic device comprises: one or more processors; and a storage apparatus, on which one or more programs are stored. When the one or more programs are executed by the one or more processors, the one or more processors implement the method according to any implements in the first aspect.

In a fourth aspect, some embodiments of the present disclosure provide a computer-readable medium, on which a computer program is stored. The program, when executed by a processor, implements the method according to any implements in the first aspect.

In a fifth aspect, some embodiments of the present disclosure provide a computer program, and the computer program comprises program codes. When a computer runs the computer program, the program codes execute the method according to any implements in the first aspect and the second aspect.

One of the above-described respective embodiments of the present disclosure has beneficial effects below: by performing division of music points on an audio material, a duration of each video clip in a composite video may be determined, so that a video material may be processed into video clips in the composite video, which, thus, reduces time for a user to process the video material and the audio material, thereby making editing easier. By adjusting the video clips in the composite video, adjustment difficulty for the user may be reduced. The video material is used to generate video clips, to further generate the composite video, which directly implements points matching of the video clips and the audio material for the user, gives the user a variety of choices, and further improves user experience.

BRIEF DESCRIPTION OF THE DRAWINGS

The above and other features, advantages and aspects of various embodiments of the present disclosure will become more apparent when taken in conjunction with the accompanying drawings and with reference to the following detailed implements. Throughout the drawings, the same or similar reference numbers refer to the same or similar elements. It should be understood that the drawings are schematic and that the components and elements are not necessarily drawn to scale.

DETAILED DESCRIPTION

Figure 1A:
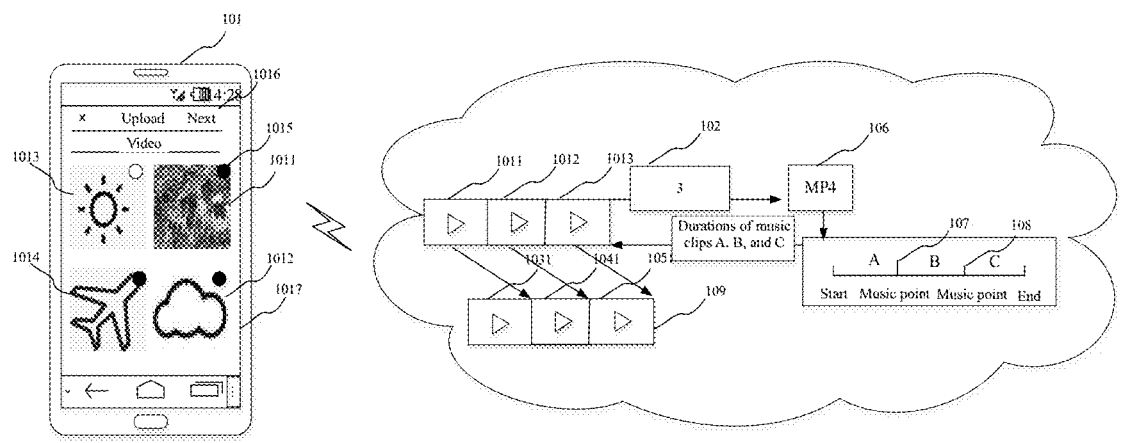
FIG. 1A and FIG. 1B are schematic diagrams of an application scenario of a video generating method according to some embodiments of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Rather, these embodiments are provided for a thorough and complete understanding of the present disclosure. It should be understood that the drawings and embodiments of the present disclosure are only for exemplary purposes, and are not intended to limit the protection scope of the present disclosure.

In addition, it should be noted that, for the convenience of description, only the parts related to the related invention are shown in the drawings. In condition of no conflict, the embodiments of this disclosure and features of the embodiments may be combined with each other.

It should be noted that concepts such as "first", "second", etc. mentioned in the present disclosure are only used to distinguish different devices, modules or units, and are not used to limit the order of functions performed by these devices, modules or units or interdependence relationship.

It should be noted that the modifications of "a" and "a plurality" mentioned in the present disclosure are illustrative rather than restrictive, and those skilled in the art should understand that unless the context clearly indicates otherwise, they should be understood as "one or a plurality of".

The names of messages or information exchanged between multiple devices in the embodiments of the present disclosure are only for illustrative purposes, and are not intended to limit the scope of these messages or information.

The present application will be described in detail below with reference to the accompanying drawings and in conjunction with the embodiments.

Figure 1B:
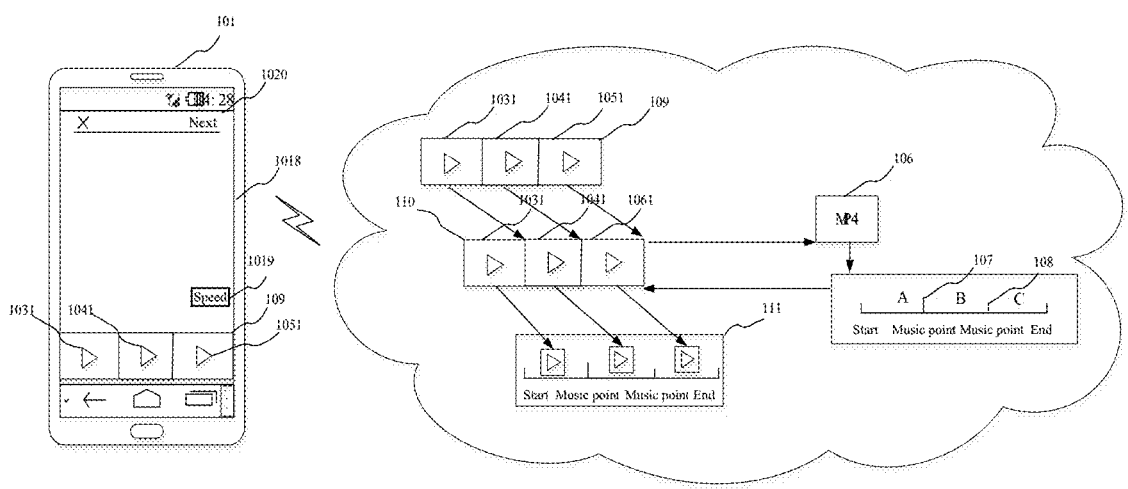

FIG. 1A and FIG. 1B are schematic diagrams of an application scenario of a video generating method according to some embodiments of the present application.

As shown in the application scenario of FIG. 1A, firstly, a user may select a plurality of video materials on an upload page 1017 of a terminal device 101, for example, video materials 1011 to 1014 shown in the upload page 1017. The user clicks the position shown in a selection box 1015, and selects video materials 1011 to 1013. The user clicks a "Next" button 1016, and the above-described terminal device 101 determines a music point 107 and a music point 108 in an acquired audio material 106 according to the amount of the selected video materials 1011 to 1013 (the video materials amount 102 is shown as 3 in the diagram). The audio material 106 is divided into music clips A, B, and C according to the music point 107 and the music point 108. The video materials 1011 to 1013 are respectively processed according to durations of the obtained music clips A to C. A first video sequence consisting of video clips 1031, 1041 and 1051 is obtained.

Thereafter, a video editing page 1018 of the terminal device 101 is skipped to as shown in FIG. 1B to perform video editing. For example, a first video sequence 109 consisting of the video clip 1031, the video clip 1041, and the video clip 1051 is shown in the video editing page 1018. The user clicks on a playback speed adjustment button 1019 of the video clip 1051 in the first video sequence 109 shown in the video editing page 1018. Thereafter, the user clicks a "Next" button 1020, and the above-described terminal device 101 adjusts the playback speed of the video clip 1051 in the first video sequence 109 to obtain a video clip 1061, and then combines the video clips 1031, 1041 and 1061 into a second video sequence 110. Finally, the above-described terminal device 101 splices the video clips 1031, 1041 and 1061 in the second video sequence 110 according to time when the music clips A to C appear in the audio material 106, and adds the audio material 106 as an audio track of the spliced video to obtain a composite video 111.

It can be understood that, the video generating method may be executed by the terminal device 101, or may also be executed by a server, or may also be executed by various software programs. The terminal device 101 may be, for example, various electronic devices having a display screen, including but not limited to, smart phones, tablet personal computers, e-book readers, laptops, desktops, etc. In addition, an executing body may also be embodied as a server, software, etc. When the executing body is software, it may be installed in the electronic devices as listed above. It may be implemented, for example, as plurality of pieces of software or software modules for supplying distributed services, or may also be implemented as a single piece of software or software module, which is not be specifically limited here.

It should be understood that, the numbers of terminal devices and servers in FIG. 1 are only exemplary. There may be any amount of terminal devices and servers according to implementation needs.

Figure 2:
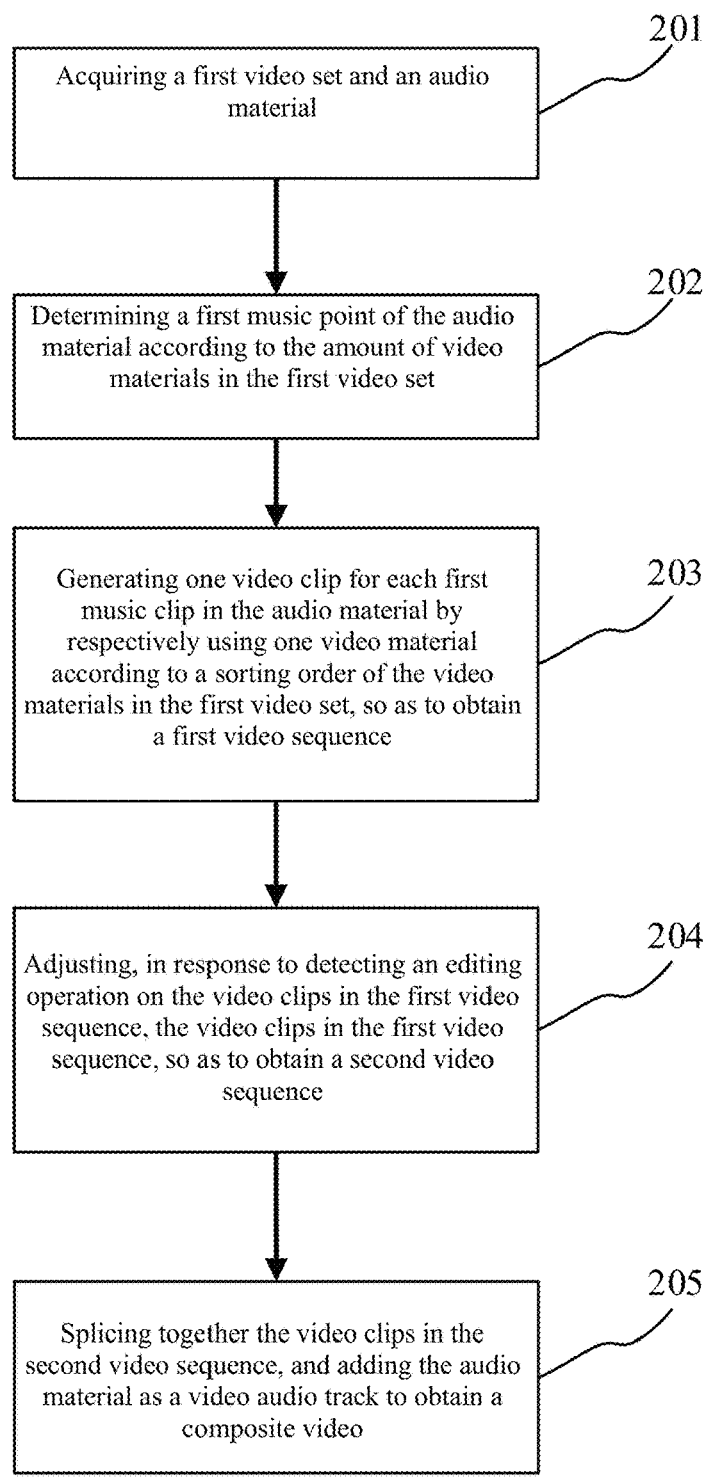
FIG. 2 is a flow chart of some embodiments of a video generating method according to the present disclosure.

With continued reference to FIG. 2, a flow 200 of some embodiments of the video generating method according to the present disclosure is shown. The video generating method includes steps below.

Step 201: acquiring a first video set and an audio material.

In some embodiments, the executing body of the video generating method (e.g., the terminal device 101 shown in FIG. 1) may acquire the video material and the audio material through wired connection or wireless connection. The above-described first video set includes a plurality of video materials.

As an example, the above-described video material may be a video or a picture stored locally by the user, or may also be a video or a picture downloaded by the user from the Internet. The above-described audio material may be music stored locally by the user or music on the network.

Step 202: determining a first music point of the audio material according to the amount of video materials in the first video set.

In some embodiments, the above-described executing body may firstly determine the first music point of the audio material. Here, the music point may be a point in the audio material that satisfies a set tempo transition condition. Then, the above-described executing body may select a target amount of music points from the obtained respective candidate music points. The above-described target amount is usually determined according to the amount of the above-described acquired video materials. As an example, when 10 video materials are acquired, 9 music points may be determined.

As yet another example, when a music point is a position in the audio material where musicality satisfying setting is changed, the above-described position where the musicality is changed may include a position where beat is changed and a position where melody is changed. Based on this, the music point may be determined in the mode below: the above-described executing body may analyze the above-described audio material, and determine a beat point and a note onset therein, the beat point is a position where the beat is changed, and the note onset is a position where the melody is changed. Specifically, on the one hand, a beat analysis algorithm based on deep learning may be used to analyze the audio material to obtain the beat point in the audio material and a timestamp where the beat point is located; on the other hand, short-term spectrum analysis is performed on the audio material to obtain the note onset in the audio material and the timestamp where the note onset is located. Here, the note onset may be obtained by an onset detector. Then, the beat point and the note onset obtained in the two ways are unified, and the beat points and note onsets are combined and deduplicated, thereby obtaining candidate music points.

Step 203: generating one video clip for each first music clip in the audio material by respectively using one video material according to a sorting order of the video materials in the first video set, so as to obtain a first video sequence.

In some embodiments, with respect to each first music clip in the audio material, the above-described executing body may generate one video clip with a same duration as the music clip for the music clip according to the sorting order of the video materials in the first video set, so as to obtain the first video sequence. The first music clip and the video clip corresponding to each other have a same duration. Here, the first video sequence usually refers to a sequence composed of generated video clips. The sorting order of the above-described sequence may be an order in which the user uploads the video materials, or may also be a random order sorted by the above-described executing body.

As an example, assuming that the music material is divided into 3 music clips, and durations of the three music clips are respectively 1 second, 2 seconds, and 3 seconds, then durations of the video clips corresponding to the above-described music clips may also be 1 second, 2 seconds, and 3 seconds, respectively.

As another example, if the music material is divided into a first clip and a second clip, the first clip may correspond to a first video material in the first video set, and the second clip may correspond to a second video material in the first video set. The order of the video materials in the first video set may be, for example, an order selected by the user.

As yet another example, in the case where the duration of the video material is greater than the duration of the first music clip, a video clip having a duration equal to the duration of the first music clip is clipped from the video material; and in the case where the duration of the video material is less than the duration of the first music clip, the original video material is subjected to variable speed processing to lengthen the duration, and then the video material subjected to variable speed processing is used as a video clip, thus making the duration of the video clip equal to the duration of the music clip.

It can be understood that, with respect to a picture material in the video material, diverse implementation modes may be used to generate the video clip from the picture material. For example, a video clip may be generated after adding an animation effect to the picture material. The above-described animation effect may be a foreground animation effect randomly added to the picture material. The foreground animation effect may be a dynamic animation effect added to the picture, for example, adding a rain animation effect to the picture. Adding an animation effect to the picture material may make the picture material more visually beautiful and improve the user's visual effect.

Step 204: adjusting, in response to detecting an editing operation on the video clips in the first video sequence, the video clips in the first video sequence, so as to obtain a second video sequence.

In some embodiments, when detecting the user's editing operation on the video clips in the first video sequence, the executing body may adjust the corresponding video clips according to the detected editing operation to obtain the second video sequence.

As an example, the above-described adjustment operation may be a video editing operation such as a playback speed adjustment operation on the video clips in the first video sequence. Here, the above-described playback speed adjustment operation may be a click operation on a preset playback speed control or an adjustment operation on the video clip playback speed by triggering a preset gesture. The above-described playback speed adjustment may be performed by playing the video clip at a high playback speed, or by playing the video clip at a low playback speed, etc., so as to adjust the playback speed.

As another example, when the executing body detects a rotation operation performed by the user on the video clip 2 in the first video sequence, the executing body may rotate the above-described video clip 2 to obtain a rotated video clip. Here, the above-described rotation operation may be an operation of clicking a preset video clip rotation control, or operations such as dragging and rotating the video clip.

Figure 3A:
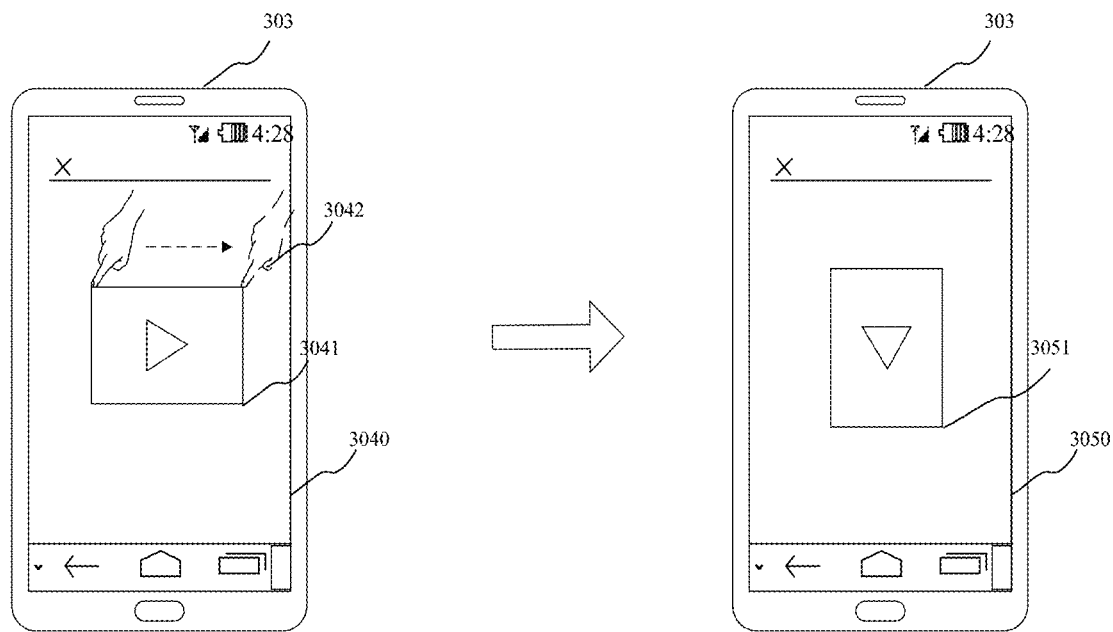
FIG. 3A is a schematic diagram of a rotation operation on a video clip according to some embodiments of the present disclosure.

As another example, the above-described rotation operation may be a drag rotation operation 3042 performed on a video clip 3041 in an interface 3040 displayed by an electronic device 303 as shown in FIG. 3A, so as to obtain a rotated video clip 3051 in an interface 3050 displayed by the electronic device 303.

Then, the executing body may replace the video clip 2 in the first video sequence with the rotated video clip to obtain the second video sequence.

In some optional implementation modes of some embodiments, in response to detecting an adjustment operation on the sorting order of the video clips in the first video sequence, the above-described executing body may, according to the adjusted sorting order of the video clips, adjust the sorting order of the video materials in the above-described first video set to obtain a second video set. Thereafter, the above-described executing body may generate one video clip for each first music clip in the above-described audio material by respectively using one video material according to the sorting order of the video materials in the above-described second video set, so as to obtain the above-described second video sequence. The first music clip and the video clip corresponding to each other have a same duration.

As an example, after the above-described executing body respectively cuts out the video clips a, b, c of 1s, 2s, and 3s according to the sorting order of the video materials A, B, C, when detecting the sorting order adjustment operation of adjusting the video clip sorting order to be b, c, a, the above-described executing body adjusts the sorting order of the corresponding video materials to the sorting order of the video materials B, C, A. Thereafter, video clips b', c', a' of is, 2s and 3s are respectively cut out according to the sorting order of the video material B, C, A, so as to obtain the second video sequence composed of the video clips b', c', a'.

In some optional implementation modes of some embodiments, the executing body may control an electronic device having a display function to display a first presenting interface of the above-described first video sequence; the executing body may move, in response to detecting an adjustment operation of moving an identifier of the video clip in the above-described first video sequence from a first sorting position to a second sorting position in the above-described first presenting interface, the above-described video clip to the second sorting position, thereby determining the adjusted sorting order of the video clips. Then, according to the adjusted sorting order of the video clips, the sorting order of the video materials in the above-described first video set is adjusted. Here, the above-described identifier may be an identifier such as preview image, screenshot, text description, etc. of a video clip.

Figure 3B:
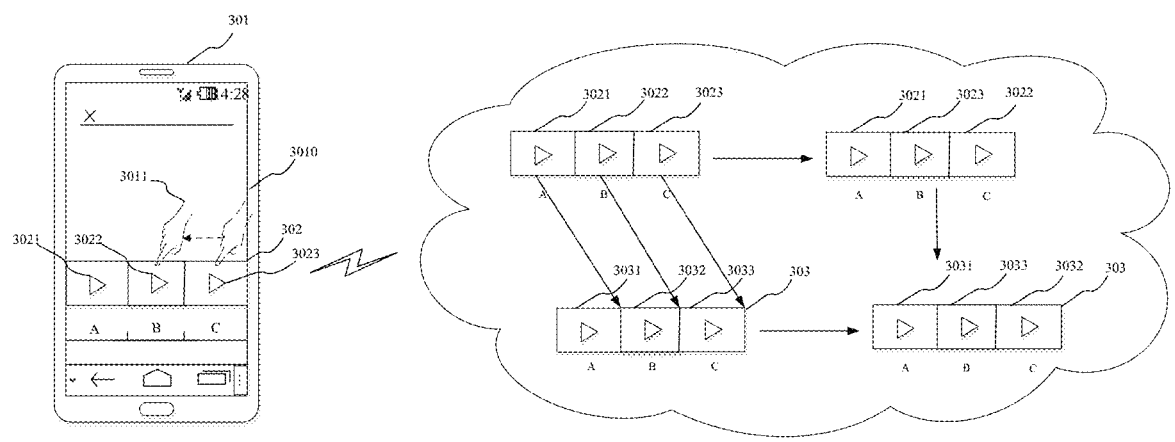
FIG. 3B is a schematic diagram of an adjustment operation on a sorting order of video clips according to some embodiments of the present disclosure.

As an example, the above-described first presenting interface may be a page 3010 displayed by an electronic device 301 as shown in FIG. 3B. When detecting the user's adjustment operation 3011 of moving a video clip 3023 in a first video sequence 302 from a first sorting position C to a second sorting position B, the above-described executing body may move the video clip 3023 from the first sorting position C to the second sorting position B, and determine the adjusted sorting order of the video clips. Thereafter, the above-described executing body may adjust the sorting order of video materials 3031 to 3033 in a first video set 303 according to the adjusted sorting order of the video clips to obtain a second video set 304.

In some optional implementation modes of some embodiments, in response to detecting a deletion operation on the first video clip in the above-described first video sequence, the first video material is deleted from the above-described first video set to obtain a third video set, and the above-described first video clip is generated based on the above-described first video material; according to the amount of video materials in the above-described third video set, a second music point of the above-described audio material is determined, and the above-described second music point is used to divide the above-described audio material into a plurality of second music clips, and the amount of the above-described second music clips is the same as the amount of video materials in the above-described second video set; and according to the sorting order of the video materials in the above-described third video set, one video clip is generated for each second music clip in the above-described audio material by respectively using one video material so as to obtain the above-described second video sequence, and the second music clip and the video clip corresponding to each other have a same duration.

As an example, when detecting a deletion operation on the first video clip b in the above-described first video sequence a, b, c, the above-described executing body deletes the video material B for generating the first video clip b in the first video material set A, B, C, and obtains the third video set A, C. Then, the executing body determines the second music point of the above-described audio material based on the amount of 2 of video materials in the third video set A, C, and further divides the above-described audio material into 2 second music clips. Finally, according to the sorting order of the video material A and the video material C in the third video set A, C, a video clip d and a video clip e are generated for the 2 second music clips, so as to obtain a second video sequence d, e.

In some optional implementation modes of some embodiments, the executing body may control an electronic device having a display function to display a second presenting interface of the above-described first video sequence. In response to detecting a selection operation on the first video clip in the above-described first video sequence in the second presenting interface of the above-described first video sequence, a first clipping operation interface for clipping the video clip from the above-described first video material is displayed. In response to detecting the deletion operation in the above-described first clipping operation interface, the above-described first video material is deleted. Here, the above-described selection operation may be an operation of clicking on the first video clip, or may also be an operation such as a long press. The above-described clipping operation interface may be an operation interface used by a user to clip the above-described first video material. The above-described deletion operation may be clicking on a preset control, or may also be a related operation such as dragging the above-described first video material.

Figure 4:
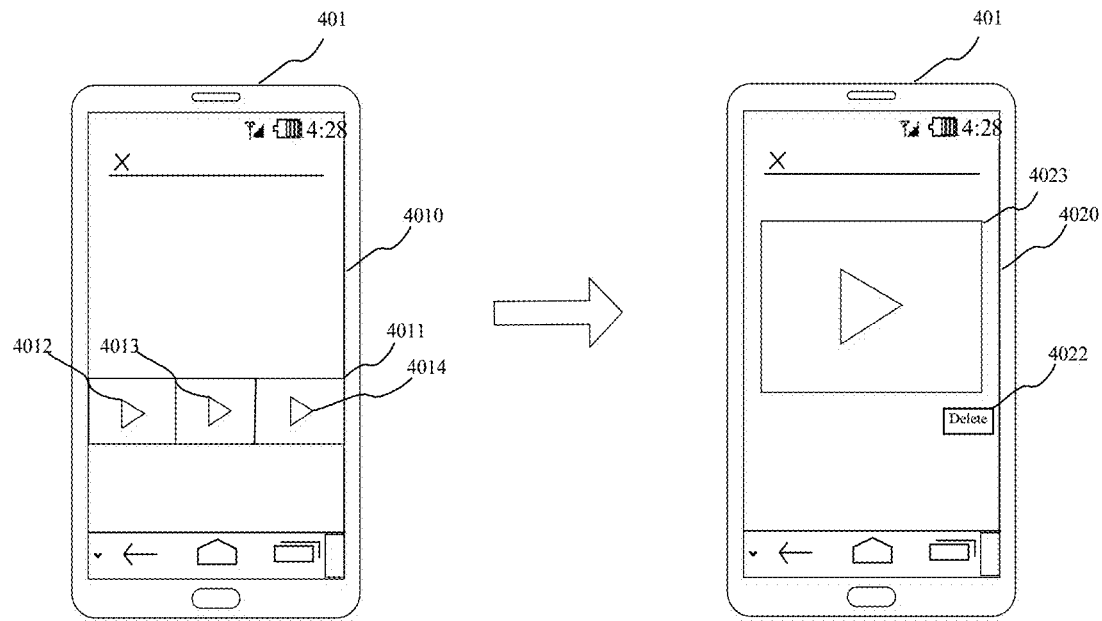
FIG. 4 is a schematic diagram of a deletion adjustment operation on a video clip according to some embodiments of the present disclosure.

As an example, the above-described second presenting interface may be a page 4010 displayed by an electronic device 401 as shown in FIG. 4. When detecting a selection operation on a first video clip 4014 in the above-described first video sequence 4011 on a second presenting page 4010, the first clipping operation interface 4020 for clipping the video clip in the above-described first video material 4023 is displayed; and when detecting a click operation on a delete control 4022 in the above-described first clipping operation interface 4020, the first video material 4023 is deleted.

In some optional implementation modes of some embodiments, in response to detecting an addition operation on video clips in the above-described first video sequence, a second video material is acquired and added to the above-described first video set to obtain a fourth video set. According to the amount of video materials in the above-described fourth video set, the third music point of the above-described audio material is determined. The above-described third music point is used to divide the above-described audio material into a plurality of third music clips. The amount of the above-described third music clips is the same as the amount of the video materials in the above-described fourth video set. According to the sorting order of the video materials in the above-described fourth video set, one video clip is generated for each third music clip in the above-described audio material by respectively using one video material, so as to obtain the above-described second video sequence. The third music clip and the video clip corresponding to each other have a same duration.

As an example, when detecting an addition operation on the video clips in the above-described first video sequence a, b, c, the above-described executing body acquires a second video material D and adds the same to the first video set A, B, C to obtain a fourth video set A, B, C, D. Then, the third music point of the above-described audio material is determined according to the amount of 4 of video materials in the fourth video set A, B, C, D, and the above-described audio material is further divided into four third music clips. Thereafter, according to the sorting order of the video materials A, B, C, and D in the above-described fourth video set A, B, C, D, one video clip is generated for each third music clip in the audio material by respectively using one video material, so as to obtain a second video sequence.

In some optional implementation modes of some embodiments, the above-described executing body may display a third presenting interface of the above-described first video sequence. In response to detecting an addition operation on the video clips in the above-described first video sequence in the third presenting interface, a browsing interface of the video material is displayed. In response to detecting a selection operation on the above-described second video material in the above-described browsing interface, the above-described second video material is acquired and added to the above-described first video set to obtain a fourth video set.

Figure 5:
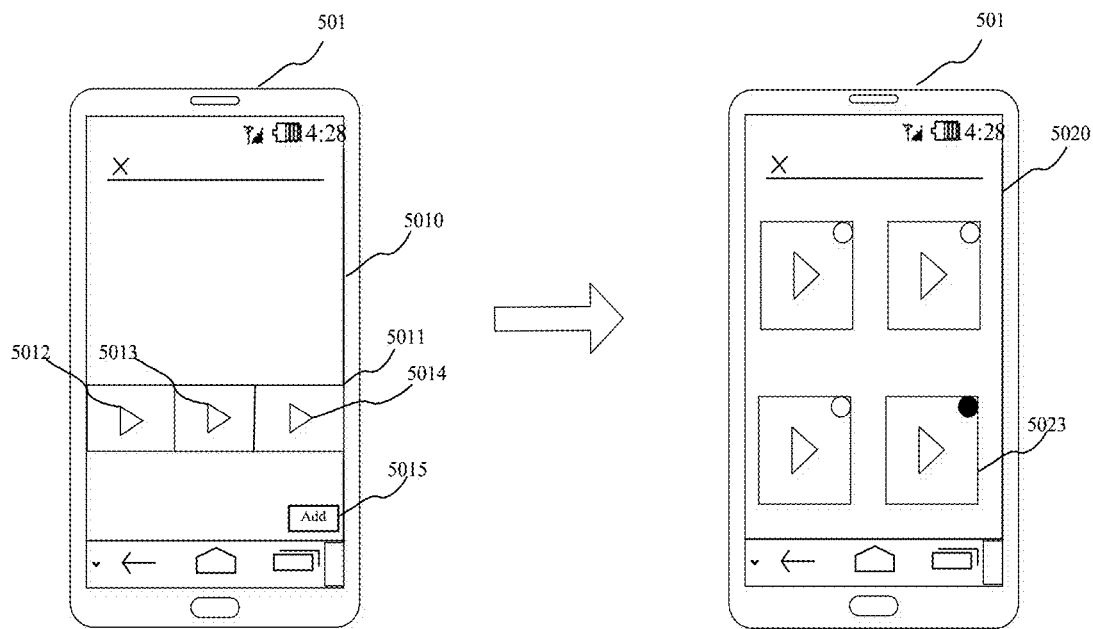
FIG. 5 is a schematic diagram of an addition adjustment operation on a video clip according to some embodiments of the present disclosure.

As an example, the above-described third presenting interface may be a page 5010 displayed by an electronic device 501 as shown in FIG. 5. When detecting a click operation on an addition control 5015 of video clips in a first video sequence 5011 in the above-described third presenting interface 5010, a browsing interface 5020 of the video material is displayed. When detecting a selection operation on the above-described second video material 5023 in the above-described browsing interface 5020, the above-described second video material is acquired and added to the first video set to obtain a second video set.

In some optional implementation modes of some embodiments, the video clips in the above-described first video sequence are cropped from the video material in the above-described first video set in a preset starting point position.

In some optional implementation modes of some embodiments, in response to detecting an automatic optimization operation on the second video clip in the above-described first video sequence, a plurality of initial video clips are cropped from different starting point positions for the music clip corresponding to the above-described second video clip by using the third video material. The music clip corresponding to the above-described second video clip has a same duration as each of the above-described initial video clips; and the above-described second video clip is generated based on the third video material. Frame extraction is respectively performed on the above-described plurality of initial video clips, and quality of the above-described plurality of initial video clips is analyzed according to images obtained by frame extraction. A third video clip with highest quality is selected from the above-described plurality of initial video clips. In the above-described first video sequence, the above-described second video clip is replaced with the above-described third video clip, so as to obtain the above-described second video sequence. Here, the above-described automatic optimization operation usually refers to an operation of a user clicking a preset automatic optimization control, etc. The above-described quality usually refers to a comprehensive score obtained by scoring the images obtained from frame extraction in the video clip. The above-described comprehensive score may be an average score or a highest score of the image scores obtained by frame extraction. The above-described scoring mode may be based on motion information (e.g., jitter, etc.), aesthetics (composition, etc.) or attributes (light color, etc.) in a frame.

In some optional implementation modes of some embodiments, the above-described executing body may display a fourth presenting interface of the second video clip in the above-described first video sequence. The above-described fourth presenting interface includes an automatic optimization control, and the above-described automatic optimization control is used to trigger automatic optimization. In response to detecting an automatic optimization operation on the above-described automatic optimization control in the above-described fourth presenting interface, a plurality of initial video clips are cropped from different starting point positions for the music clip corresponding to the above-described second video clip by using the third video material. Here, the above-described automatic optimization control may be a button or a preset control for triggering a gesture, etc.

Figure 6A:
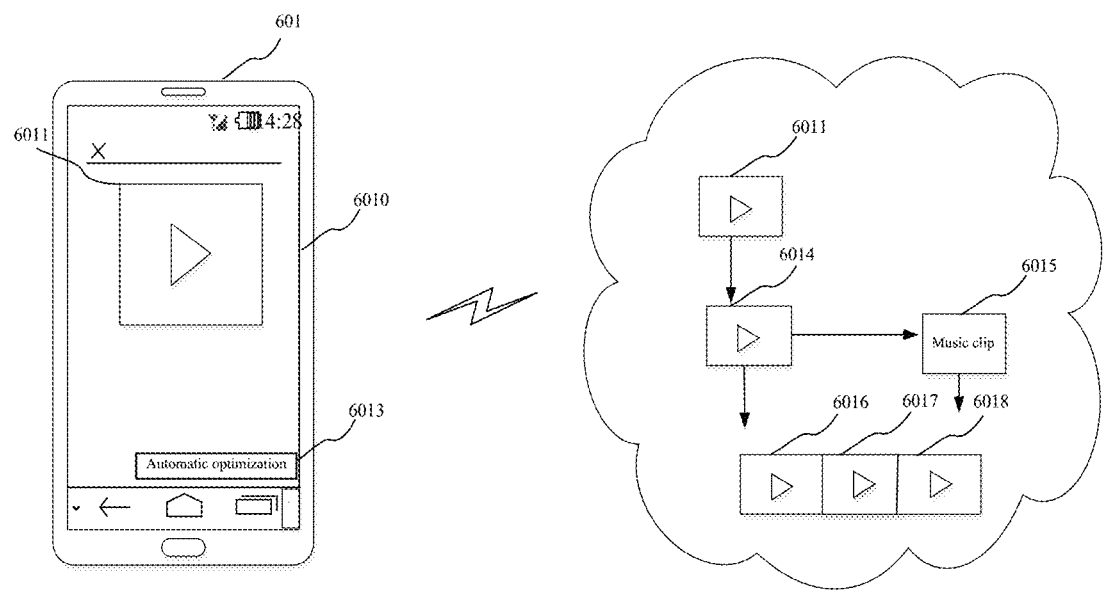
FIG. 6A is a schematic diagram of an automatic optimization adjustment operation on a video clip according to some embodiments of the present disclosure.

As an example, the above-described fourth presenting interface displaying the second video clip 6011 in the first video sequence may be a page 6010 displayed by an electronic device 601 as shown in FIG. 6A. When detecting a click operation on the automatic optimization control 6013 in the above-described fourth presenting interface 6010, a plurality of initial video clips 6016 to 6018 are cropped from different starting point positions for the music clip 6015 corresponding to the above-described second video clip 6011 by using the third video material 6014.

In some optional implementation modes of some embodiments, when detecting a manual optimization operation on the fourth video clip in the above-described first video sequence, the executing body may determine a cropping interval selected by the above-described manual optimization operation in the above-described fourth video material. Thereafter, according to the above-described cropping interval, a fifth video clip is cropped from the above-described fourth video material. Finally, in the above-described first video sequence, the above-described fourth video clip is replaced with the above-described fifth video clip to obtain the above-described second video sequence.

In some optional implementation modes of some embodiments, the above-described executing body may display a fifth presenting interface of the above-described first video sequence. In response to detecting a selection operation on the above-described fourth video clip in the above-described fifth presenting interface, a second clipping operation interface for clipping the video clip from the above-described fourth video material is displayed. In response to detecting a selection operation on a clipping interval in the above-described second clipping operation interface, the cropping interval selected in the above-described fourth video material is determined.

Figure 6B:
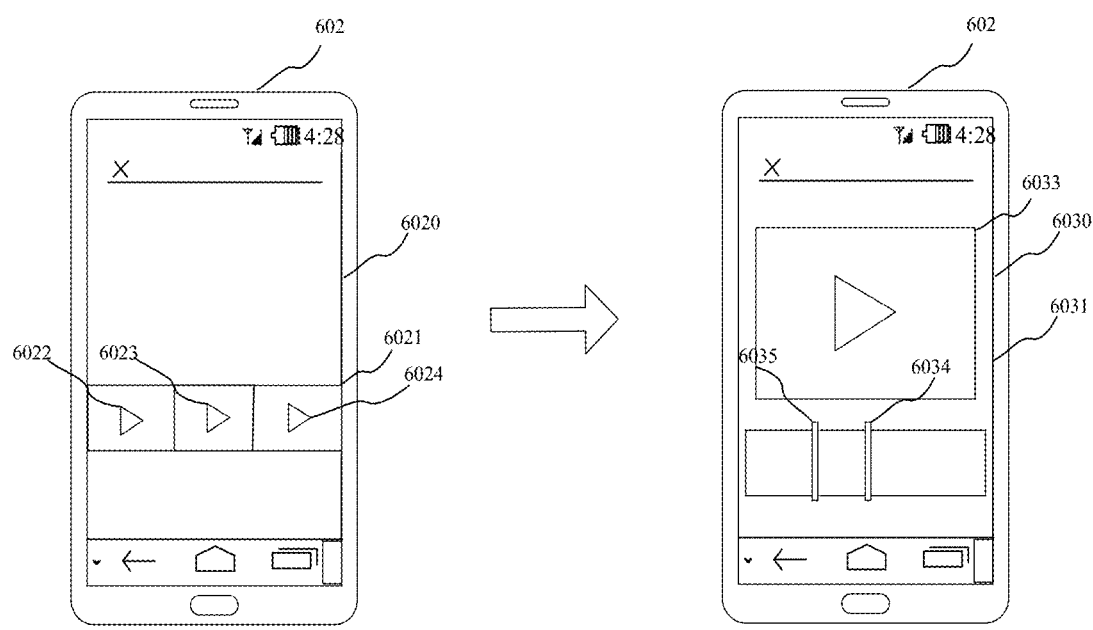
FIG. 6B is a schematic diagram of a manual optimization adjustment operation on a video clip according to some embodiments of the present disclosure.
Figure 7:
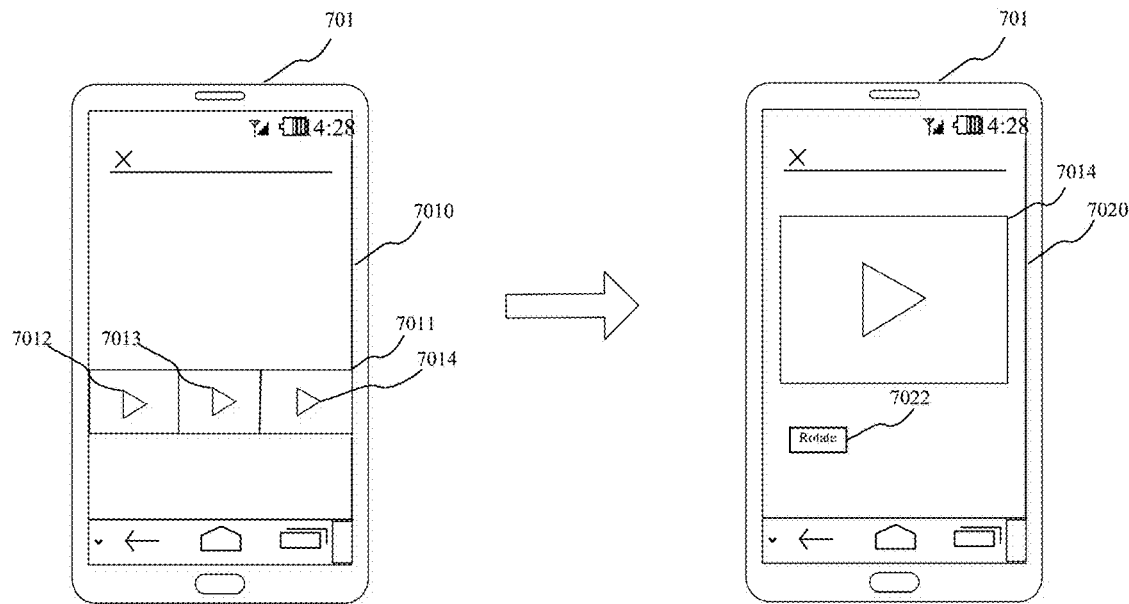
FIG. 7 is a schematic diagram of a rotation adjustment operation on a video clip according to some embodiments of the present disclosure.

As an example, the above-described fifth presenting interface displaying the first video sequence 6021 may be a page 6020 displayed by an electronic device 602 as shown in FIG. 6B. When detecting a selection operation on the above-described fourth video clip 6024 in the above-described fifth presenting interface 6020, a second clipping operation interface 6030 for clipping the video clip in the above-described fourth video material 6033 is displayed. When detecting a selection operation on clipping intervals 6035 to 6034 in the above-described second clipping operation interface, the cropping intervals 6034 to 6035 selected in the fourth video material are determined.

In some optional implementation modes of some embodiments, the above-described executing body may, in response to detecting a rotation operation on the sixth video clip in the above-described first video sequence, rotate the above-described sixth video clip to obtain a seventh video clip. In the above-described first video sequence, the above-described sixth video clip is replaced with the above-described seventh video clip, so as to obtain the above-described second video sequence.

In some optional implementation modes of some embodiments, the above-described executing body may display the sixth presenting interface of the above-described first video sequence. In response to detecting a selection operation on the sixth video clip in the above-described sixth presenting interface, a rotation operation interface of the above-described sixth video clip is displayed. In response to detecting a rotation operation on the above-described sixth video clip in the above-described rotation operation interface, the above-described sixth video clip is rotated to obtain a seventh video clip.

As an example, the above-described sixth presenting interface may be a page 7010 displayed on an electronic device 701. When detecting a selection operation on the sixth video clip 7014, a rotation operation interface 7020 of the above-described sixth video clip 7014 is displayed. When detecting a click operation on a rotation control 7022 of the sixth video clip 7014 in the above-described selection operation interface 7020, the above-described sixth video clip 7014 is rotated to obtain a seventh video clip.

Step 205: splicing together the video clips in the second video sequence, and adding the audio material as a video audio track to obtain a composite video.

The executing body of the video generating method may sequentially splice together the video clips in the second video sequence corresponding to the above-described music clips according to an order in which the above-described music clips appear in the above-described audio material, and add the above-described audio material in the audio track of the spliced video to obtain a composite video.

As an example, the above-described audio material may be divided into 3 clips in sequence according to music points, for example, clip A may be from second 0 to second 2, clip B may be from second 2 to second 5, and clip C may be from second 5 to second 10. The video clips in the corresponding second video sequence are respectively clip a, clip b, and clip c. Then the spliced video may be represented as abc. The above-described audio material is added to the audio track of the spliced video abc to obtain a composite video.

It should be noted that, with respect to the editing on the video clips in the above-described first video sequence, the above-described editing on the video clips in the above-described first video sequence may be retained when the mode is converted.

As an example, if a sequence adjustment operation is performed on the video clips a, b and c in the video sequence to obtain video clips d, e and f, and then a composite video A is generated from the video clips d, e and f after switching modes, the generated composite video A is still generated by d, e and f Here, the above-described mode usually refers to a mode in which a composite video is generated from an audio material and a video set, or a mode in which a composite video is obtained by splicing the video materials in the video set.

In the video generating method disclosed by some embodiments of the present disclosure, by performing division of music points on an audio material, the duration of each video clip in the composite video can be determined, so that the video material can be processed into video clips in the composite video, which, thus, reduces time for a user to process the video material and the audio material, thus making editing easier. By adjusting the video clips in the composite video, adjustment difficulty for the user can be reduced. The video material is used to generate video clips, to further generate the composite video, which directly implements points matching of the video clips and the audio material for the user, gives the user a variety of choices, and further improves user experience.

Figure 8:
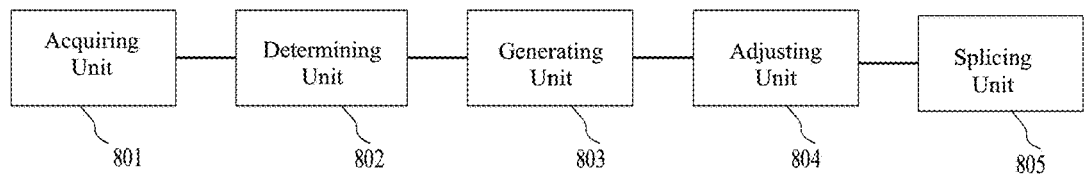
FIG. 8 is a structural schematic diagram of some embodiments of an apparatus for generating a video according to the present disclosure.

With further reference to FIG. 8, as implementation of the methods shown in the above-described respective diagrams, the present disclosure provides some embodiments of a webpage generating apparatus, these apparatus embodiments correspond to those method embodiments shown in FIG. 2, and the apparatus can be specifically applied to various electronic devices.

As shown in FIG. 8, a webpage generating apparatus 800 according to some embodiments includes: an acquiring unit 801, a determining unit 802, a generating unit 803, an adjusting unit 804, and a splicing unit 805. The acquiring unit 801 is configured to acquire a first video set and an audio material, and the above-described first video set includes a plurality of video materials; the determining unit 802 is configured to determine a first music point of the above-described audio material according to the amount of video materials in the above-described first video set, the above-described first music point is used to divide the above-described audio material into a plurality of first music clips, and the amount of the above-described first music clips is the same as the amount of video materials in the above-described first video set; the generating unit 803 is configured to generate, according to the sorting order of the video materials in the above-described first video set, one video clip for each first music clip in the above-described audio material by respectively using one video material, so as to obtain a first video sequence, the first music clip and the video clip corresponding to each other have a same duration; the adjusting unit 804 is configured to adjust, in response to detecting an editing operation on the video clips in the above-described first video sequence, the video clips in the above-described first video sequence, so as to obtain a second video sequence; and the splicing unit 805 is configured to splice together the video clips in the above-described second video sequence, and add the above-described audio material as a video audio track to obtain a composite video.

In optional implementation modes of some embodiments, the adjusting unit 801 of the video generating apparatus 800 is further configured to: adjust, in response to detecting an adjustment operation on the sorting order of the video clips in the above-described first video sequence, the sorting order of the video materials in the above-described first video set according to the adjusted sorting order of the video clips to obtain a second video set; generate, according to a sorting order of video materials in the above-described second video set, one video clip for each first music clip in the above-described audio material by respectively using one video material, so as to obtain the above-described second video sequence. The first music clip and the video clip corresponding to each other have a same duration.

In optional implementation modes of some embodiments, the video generating apparatus 800 may further include a first sub-unit, and the first sub-unit is configured to: display a first presenting interface of the above-described first video sequence; move, in response to detecting the adjustment operation of moving an identifier of the video clip in the above-described first video sequence from a first sorting position to a second sorting position in the above-described first presenting interface, the above-described video clip to the second sorting position, and further determine the adjusted sorting order of the video clips; adjust the sorting order of the video materials in the above-described first video set according to the adjusted sorting order of the above-described video clips.

In optional implementation modes of some embodiments, the adjusting unit 801 of the video generating apparatus 800 is further configured to: delete, in response to detecting a deletion operation on the first video clip in the above-described first video sequence, the first video material from the above-described first video set to obtain a third video set, where the above-described first video clip is generated based on the above-described first video material; determine the second music point of the above-described audio material according to the amount of video materials in the above-described third video set, where the above-described second music point is used to divide the above-described audio material into a plurality of second music clips, and the amount of the above-described second music clips is the same as the amount of video materials in the above-described third video set; and generate, according to the sorting order of the video materials in the above-described third video set, one video clip for each second music clip in the above-described audio material by respectively using one video material, so as to obtain the above-described second video sequence, where the second music clip and the video clip corresponding to each other have a same duration.

In optional implementation modes of some embodiments, the video generating apparatus 800 may further include a second sub-unit, and the second sub-unit is configured to: display a second presenting interface of the above-described first video sequence; display, in response to detecting a selection operation on the first video clip in the above-described first video sequence in the second presenting interface of the above-described first video sequence, a first clipping operation interface for clipping the video clip from the above-described first video material; and delete, in response to detecting the deletion operation in the above-described first clipping operation interface, the above-described first video material.

In optional implementation modes of some embodiments, the adjusting unit 801 of the video generating apparatus 800 is further configured to: acquire, in response to detecting an addition operation on the video clips in the above-described first video sequence, a second video material and add the same to the above-described first video set to obtain a fourth video set; determine a third music point of the above-described audio material according to the amount of video materials in the above-described fourth video set, where the above-described third music point is used to divide the above-described audio material into a plurality of third music clips, and the amount of the above-described third music clips is the same as the amount of video materials in the above-described fourth video set; generate, according to the sorting order of the video materials in the above-described fourth video set, one video clip for each third music clip in the above-described audio material by respectively using one video material, so as to obtain the above-described second video sequence, where the third music clip and the video clip corresponding to each other have a same duration.

In optional implementation modes of some embodiments, the video generating apparatus 800 may further include a third sub-unit, and the third sub-unit is configured to: display a third presenting interface of the above-described first video sequence; display, in response to detecting an addition operation on the video clips in the above-described first video sequence in the third presenting interface, a browsing interface of the video materials; and acquire, in response to detecting a selection operation on the above-described second video material in the above-described browsing interface, the above-described second video material and add the same to the above-described first video set to obtain a fourth video set.

In optional implementation modes of some embodiments, the video clip in the above-described first video sequence is cropped from the video material in the above-described first video set in a preset starting point position.

In optional implementation modes of some embodiments, the adjusting unit 801 of the video generating apparatus 800 is further configured to: crop, in response to detecting an automatic optimization operation on the second video clip in the above-described first video sequence, a plurality of initial video clips from different starting point positions for the music clip corresponding to the above-described second video clip by using the third video material, where the music clip corresponding to the above-described second video clip has a same duration as each of the above-described initial video clips, and the above-described second video clip is generated based on the third video material; respectively perform frame extraction on the above-described plurality of initial video clips, and analyze quality of the above-described plurality of initial video clips according to images obtained by frame extraction; select a third video clip with highest quality from the above-described plurality of initial video clips; and replace the above-described second video clip with the above-described third video clip in the above-described first video sequence, so as to obtain the above-described second video sequence.

In optional implementation modes of some embodiments, the video generating apparatus 800 may further include a fourth sub-unit, and the fourth sub-unit is configured to: display a fourth presenting interface of the second video clip in the above-described first video sequence, where the above-described fourth presenting interface includes an automatic optimization control, and the above-described automatic optimization control is used to trigger automatic optimization; and crop, in response to detecting the automatic optimization operation on the above-described automatic optimization control in the above-described fourth presenting interface, a plurality of initial video clips from different starting point positions for the music clip corresponding to the above-described second video clip by using the third video material.

In optional implementation modes of some embodiments, the adjusting unit 801 of the video generating apparatus 800 is further configured to: determine, in response to detecting a manual optimization operation on the fourth video clip in the above-described first video sequence, a cropping interval selected by the above-described manual optimization operation in the above-described fourth video material; crop a fifth video clip from the fourth video material according to the above-described cropping interval; and replace the above-described fourth video clip with the above-described fifth video clip in the above-described first video sequence, so as to obtain the above-described second video sequence.

In optional implementation modes of some embodiments, the video generating apparatus 800 may further include a fifth sub-unit, and the fifth sub-unit is configured to: display a fifth presenting interface of the above-described first video sequence; display, in response to detecting a selection operation on the above-described fourth video clip in the above-described fifth presenting interface, a second clipping operation interface for clipping the video clip from the above-described fourth video material; and determine, in response to detecting a selection operation on a clipping interval in the above-described second clipping operation interface, a cropping interval selected in the above-described the fourth video material.

In optional implementation modes of some embodiments, the adjusting unit 801 of the video generating apparatus 800 is further configured to: rotate, in response to detecting a rotation operation on a sixth video clip in the above-described first video sequence, the above-described sixth video clip to obtain a seventh video clip; and replace the above-described sixth video clip with the above-described seventh video clip in the above-described first video sequence, so as to obtain the above-described second video sequence.

In optional implementation modes of some embodiments, the video generating apparatus 800 may further include a sixth sub-unit, and the sixth sub-unit is configured to: display a sixth presenting interface of the above-described first video sequence; display, in response to detecting a selection operation on a sixth video clip in the above-described sixth presenting interface, a rotation operation interface of the above-described sixth video clip; and rotate, in response to detecting a rotation operation on the sixth video clip in the above-described rotation operation interface, the sixth video clip to obtain a seventh video clip.

In the apparatus for generating a video disclosed by some embodiments of the present disclosure, by performing division of music points on an audio material, the duration of each video clip in a composite video can be determined, so that the video material can be processed into video clips in the composite video, which, thus, reduces time for a user to process the video material and the audio material, thereby making editing easier. By adjusting the video clips in the composite video, adjustment difficulty for the user can be reduced. The video material is used to generate video clips, so as to further generate the composite video, which directly implements points matching of the video clips and the audio material for the user, gives the user a variety of choices, and further improves user experience.

Hereinafter, referring to FIG. 9, it shows a structural schematic diagram of an electronic device (e.g., the terminal device in FIG. 1) 900 suitable for implementing some embodiments of the present disclosure. The electronic device shown in FIG. 9 is only an example, and should not impose any limitation on functions and use scope of the embodiments of the present disclosure.

Figure 9:
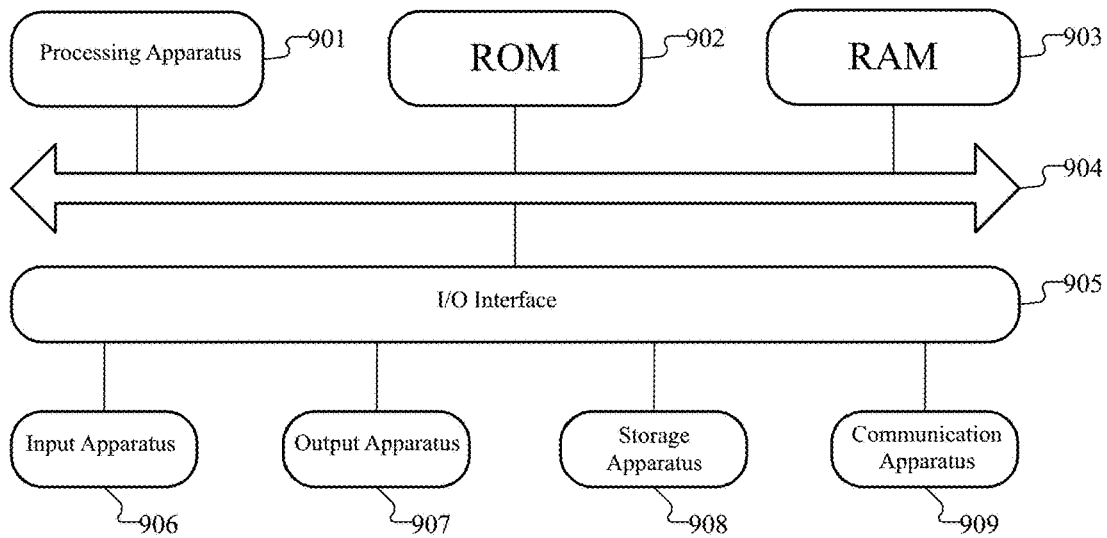
FIG. 9 is a structural schematic diagram of an electronic device suitable for implementing some embodiments of the present disclosure.

As shown in FIG. 9, the electronic device 900 may include a processing apparatus (e.g., a central processing unit, a graphics processor, etc.) 901, which may executes various appropriate actions and processing according to a program stored in a read-only memory (ROM) 902 or a program loaded from a storage apparatus 908 into a random access memory (RAM) 903. The random access memory (RAM) 903 further stores various programs and data required for operation of the electronic device 900. The processing apparatus 901, the ROM 902, and the RAM 903 are connected with each other through a bus 904. An input/output (I/O) interface 905 is also coupled to the bus 904.

Usually, apparatuses below may be coupled to the I/O interface 905: an input apparatus 906 including, for example, a touch screen, a touch pad, a keyboard, a mouse, a camera, a microphone, an accelerometer, a gyroscope, etc.; an output apparatus 907 including, for example, a liquid crystal display (LCD), a speaker, a vibrator, etc.; and a communication apparatus 909. The communication apparatus 909 may allow the electronic device 900 to perform wireless or wired communication with other electronic device so as to exchange data. Although FIG. 9 shows the electronic device 900 having various apparatuses, it should be understood that, it is not required to implement or have all the apparatuses shown, and the electronic device 900 may alternatively implement or have more or fewer apparatuses. Each block shown in FIG. 9 may represent one apparatus, or may also represent a plurality of apparatuses as needed.

Particularly, according to some embodiments of the present disclosure, the flows as described above with reference to the flow charts may be implemented as computer software programs. For example, some embodiments of the present disclosure include a computer program product, which includes a computer program carried on a computer-readable medium, and the computer program contains program codes for executing the method illustrated in the flow chart. In some such embodiments, the computer program may be downloaded and installed from the network via the communication apparatus 909, or installed from the storage apparatus 908, or installed from the ROM 902. When executed by the processing apparatus 901, the computer program executes the above-described functions defined in the methods according to some embodiments of the present disclosure.

It should be noted that, in some embodiments of the present disclosure, the above-described computer-readable medium may be a computer-readable signal medium or a computer-readable storage medium, or any combination of the above two. The computer-readable storage medium may be, for example, but not limited to, an electronic, magnetic, optical, electromagnetic, infrared, or semiconductor system, apparatus, or device, or any suitable combination of the above. More specific examples of the computer-readable storage medium may include, but not limited to: an electrical connection having one or more conductors, a portable computer diskette, a hard disk, a random access memory (RAM), a read-only memory (ROM); an erasable programmable read-only memory (EPROM or flash memory); an optical fiber, a portable compact disc read-only memory (CD-ROM); an optical storage apparatus; a magnetic storage apparatus; or any suitable combination of the above. In some embodiments of the present disclosure, the computer-readable storage medium may be any tangible medium that contains or stores a program that may be used by or in conjunction with an instruction executing system, an apparatus, or a device. In some embodiments of the present disclosure, the computer-readable signal medium may include a data signal propagated in baseband or as a portion of a carrier wave, which carries a computer-readable program code therein. Such propagated data signals may take a variety of forms, including but not limited to, electromagnetic signals, optical signals, or any suitable combination of the above. The computer-readable signal medium may also be any computer-readable medium other than a computer-readable storage medium; and the computer-readable signal medium may transmit, propagate, or transport programs for use by or in combination with the instruction executing system, the apparatus, or the device. The program code embodied on the computer-readable medium may be transmitted by using any suitable medium, including, but not limited to, an electrical wire, an optical cable, a radio frequency (RF), etc., or any suitable combination of the above.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-described computer-readable medium may be included in the above-described electronic device, or may also exist alone without being assembled into the electronic device. The above-described computer-readable medium carries one or more programs, and when the one or more programs are executed by the electronic device, the electronic device is cause to: acquire a first video set and an audio material, the above-described first video set including a plurality of video materials; determine a first music point of the above-described audio material according to the amount of video materials in the above-described first video set, where the above-described first music point is used to divide the above-described audio material into a plurality of first music clips, and the amount of the above-described first music clips is the same as the amount of video materials in the above-described first video set; generate, according to the sorting order of the video materials in the above-described first video set, one video clip for each first music clip in the above-described audio material by respectively using one video material, to obtain a first video sequence, where the first music clip and the video clip corresponding to each other have a same duration; adjust, in response to detecting an editing operation on the video clips in the above-described first video sequence, the video clips in the above-described first video sequence, to obtain a second video sequence; and splice together the video clips in the above-described second video sequence, and add the above-described audio material as a video audio track to obtain a composite video.

The computer program codes for executing the operations according to some embodiments of the present disclosure may be written in one or more programming languages or a combination thereof; the above-described programming languages include object-oriented programming languages such as Java, Smalltalk, C++, and also include conventional procedural programming languages such as "C" language or similar programming languages. The program code may by executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flow chart and block diagrams in the accompanying drawings illustrate the architecture, functionality, and operation of possible implementations of systems, methods, and computer program products according to various embodiments of the present disclosure. In this regard, each block in the flow chart or block diagrams may represent a module, a program segment, or a portion of codes, which comprises one or more executable instructions for implementing specified logical function. It should also be noted that, in some alternative implementations, the functions noted in the block may occur out of the order noted in the accompanying drawings. For example, two blocks shown in succession may, in fact, can be executed substantially concurrently, or the blocks may sometimes be executed in a reverse order, depending upon the functionality involved. It should also be noted that, each block of the block diagrams and/or flow charts, and combinations of blocks in the block diagrams and/or flow charts, may be implemented by special purpose hardware-based systems that execute the specified functions or operations, or may also be implemented by a combination of special purpose hardware and computer instructions.

The units as described in some embodiments of the present disclosure may be implemented by means of software, or may also be implemented by means of hardware. The described unit may also be provided in a processor, which, for example, may be described as: a processor, including an acquiring unit, a determining unit, a generating unit, an adjusting unit and a splicing unit. Names of these units do not constitute a limitation on the units themselves in some cases, for example, the acquiring unit may also be described as "a unit for acquiring the first video set and the audio material".

The functions described herein above may be executed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

According to one or more embodiments of the present disclosure, a video generating method is provided. The video generating method comprises: acquiring a first video set and an audio material, the first video set comprising a plurality of video materials; determining a first music point of the audio material according to an amount of the video materials in the first video set, where the first music point is used to divide the audio material into a plurality of first music clips, and an amount of the first music clips is same as the amount of the video materials in the first video set; generating, according to a sorting order of the video materials in the first video set, one video clip for each first music clip in the audio material by respectively using one video material, so as to obtain a first video sequence, where the first music clip and the video clip corresponding to each other have a same duration; adjusting, in response to detecting an editing operation on the video clip in the first video sequence, the video clip in the first video sequence, so as to obtain a second video sequence; and splicing together video clips in the second video sequence, and adding the audio material as a video audio track to obtain a composite video.

According to one or more embodiments of the present disclosure, adjusting, in response to detecting the editing operation on the video clip in the first video sequence, the video clip in the first video sequence, so as to obtain the second video sequence, comprises: adjusting, in response to detecting an adjustment operation on a sorting order of video clips in the first video sequence, the sorting order of the video materials in the first video set according to an adjusted sorting order of the video clips, so as to obtain a second video set; and generating, according to a sorting order of video materials in the second video set, one video clip for each first music clip in the audio material by respectively using one video material, so as to obtain the second video sequence, where the first music clip and the video clip corresponding to each other have a same duration.

According to one or more embodiments of the present disclosure, adjusting, in response to detecting the adjustment operation on the sorting order of the video clips in the first video sequence, the sorting order of the video materials in the first video set according to the adjusted sorting order of the video clips, so as to obtain the second video set, comprises: displaying a first presenting interface of the first video sequence; moving, in response to detecting the adjustment operation of moving an identifier of a video clip in the first video sequence from a first sorting position to a second sorting position in the first presenting interface, the video clip to the second sorting position, and determining the adjusted sorting order of the video clips; and adjusting the sorting order of the video materials in the first video set according to the adjusted sorting order of the video clips, so as to obtain the second video set.

According to one or more embodiments of the present disclosure, adjusting, in response to detecting the editing operation on the video clip in the first video sequence, the video clip in the first video sequence, so as to obtain the second video sequence, comprises: deleting, in response to detecting a deletion operation on a first video clip in the first video sequence, a first video material from the first video set to obtain a third video set, where the first video clip is generated based on the first video material; determining a second music point of the audio material according to an amount of video materials in the third video set, where the second music point is used to divide the audio material into a plurality of second music clips, and an amount of the second music clips is same as the amount of the video materials in the third video set; and generating, according to a sorting order of the video materials in the third video set, one video clip for each second music clip in the audio material by respectively using one video material, so as to obtain the second video sequence, where the second music clip and the video clip corresponding to each other have a same duration.

According to one or more embodiments of the present disclosure, deleting, in response to detecting the deletion operation on the first video clip in the first video sequence, the first video material from the first video set, comprises: displaying a second presenting interface of the first video sequence; displaying, in response to detecting a selection operation on the first video clip in the first video sequence in the second presenting interface of the first video sequence, a first clipping operation interface for clipping the video clip from the first video material; and deleting, in response to detecting the deletion operation in the first clipping operation interface, the first video material.

According to one or more embodiments of the present disclosure, adjusting, in response to detecting the editing operation on the video clip in the first video sequence, the video clip in the first video sequence, so as to obtain the second video sequence, comprises: acquiring, in response to detecting an addition operation on video clips in the first video sequence, a second video material, and adding the second video material to the first video set to obtain a fourth video set; determining a third music point of the audio material according to an amount of video materials in the fourth video set, where the third music point is used to divide the audio material into a plurality of third music clips, and an amount of the third music clips is same as the amount of the video materials in the fourth video set; and generating, according to a sorting order of the video materials in the fourth video set, one video clip for each third music clip in the audio material by respectively using one video material, so as to obtain the second video sequence, where the third music clip and the video clip corresponding to each other have a same duration.

According to one or more embodiments of the present disclosure, acquiring, in response to detecting the addition operation on the video clips in the first video sequence, the second video material, and adding the second video material to the first video set to obtain the fourth video set, comprises: displaying a third presenting interface of the first video sequence; displaying, in response to detecting the addition operation on the video clips in the first video sequence in the third presenting interface, a browsing interface of the video materials; and acquiring, in response to detecting a selection operation on the second video material in the browsing interface, the second video material, and adding the second video material to the first video set to obtain the fourth video set.

According to one or more embodiments of the present disclosure, the video clip in the first video sequence is cropped from the video material in the first video set in a preset starting point position.

According to one or more embodiments of the present disclosure, adjusting, in response to detecting the editing operation on the video clip in the first video sequence, the video clip in the first video sequence, so as to obtain the second video sequence, comprises: cropping, in response to detecting an automatic optimization operation on a second video clip in the first video sequence, a plurality of initial video clips from different starting point positions for a music clip corresponding to the second video clip by using a third video material, where the music clip corresponding to the second video clip has a same duration as each of the initial video clips, and the second video clip is generated based on the third video material; respectively performing frame extraction on the plurality of initial video clips, and analyzing quality of the plurality of initial video clips according to images obtained by frame extraction; selecting a third video clip with highest quality from the plurality of initial video clips; and replacing the second video clip with the third video clip in the first video sequence, so as to obtain the second video sequence.

According to one or more embodiments of the present disclosure, cropping, in response to detecting the automatic optimization operation on the second video clip in the first video sequence, the plurality of initial video clips from different starting point positions for the music clip corresponding to the second video clip by using the third video material, comprises: displaying a fourth presenting interface of the second video clip in the first video sequence, where the fourth presenting interface comprises an automatic optimization control, and the automatic optimization control is used to trigger automatic optimization; and cropping, in response to detecting the automatic optimization operation on the automatic optimization control in the fourth presenting interface, the plurality of initial video clips from different starting point positions for the music clip corresponding to the second video clip by using the third video material.

According to one or more embodiments of the present disclosure, adjusting, in response to detecting the editing operation on the video clip in the first video sequence, the video clip in the first video sequence, so as to obtain the second video sequence, comprises: determining, in response to detecting a manual optimization operation on a fourth video clip in the first video sequence, a cropping interval selected by the manual optimization operation in the fourth video material; cropping a fifth video clip from the fourth video material according to the cropping interval; and replacing the fourth video clip with the fifth video clip in the first video sequence, so as to obtain the second video sequence.

According to one or more embodiments of the present disclosure, determining, in response to detecting the manual optimization operation on the fourth video clip in the first video sequence, the cropping interval selected by the manual optimization operation in the fourth video material, comprises: displaying a fifth presenting interface of the first video sequence; displaying, in response to detecting a selection operation on the fourth video clip in the fifth presenting interface, a second clipping operation interface for clipping the video clip from the fourth video material; and determining, in response to detecting the selection operation on a clipping interval in the second clipping operation interface, the cropping interval selected in the fourth video material.

According to one or more embodiments of the present disclosure, adjusting, in response to detecting the editing operation on the video clip in the first video sequence, the video clip in the first video sequence, so as to obtain the second video sequence, comprises: rotating, in response to detecting a rotation operation on a sixth video clip in the first video sequence, the sixth video clip to obtain a seventh video clip; and replacing the sixth video clip with the seventh video clip in the first video sequence, so as to obtain the second video sequence.

According to one or more embodiments of the present disclosure, rotating, in response to detecting the rotation operation on the sixth video clip in the first video sequence, the sixth video clip to obtain the seventh video clip, comprises: displaying a sixth presenting interface of the first video sequence; displaying, in response to detecting a selection operation on the sixth video clip in the sixth presenting interface, a rotation operation interface of the sixth video clip; and rotating, in response to detecting the rotation operation on the sixth video clip in the rotation operation interface, the sixth video clip to obtain the seventh video clip.

According to one or more embodiments of the present disclosure, a video generating apparatus comprises: an acquiring unit, configured to acquire a first video set and an audio material, the first video set comprising a plurality of video materials; a determining unit, configured to determine a first music point of the audio material according to an amount of the video materials in the first video set, where the first music point is used to divide the audio material into a plurality of first music clips, and an amount of the first music clips is same as the amount of the video materials in the first video set; a generating unit, configured to generate, according to a sorting order of the video materials in the first video set, one video clip for each first music clip in the audio material by respectively using one video material, so as to obtain a first video sequence, where the first music clip and the video clip corresponding to each other have a same duration; an adjusting unit, configured to adjust, in response to detecting an editing operation on the video clip in the first video sequence, the video clip in the first video sequence, so as to obtain a second video sequence; and a splicing unit, configured to splice together video clips in the second video sequence, and add the audio material as a video audio track to obtain a composite video.

According to one or more embodiments of the present disclosure, an electronic device is provided. The electronic device comprises: one or more processors; and a storage apparatus, on which one or more programs are stored. When the one or more programs are executed by the one or more processors, the one or more processors implement the method described in any embodiments described above.

According to one or more embodiments of the present disclosure, a computer-readable medium is provided. A computer program is stored on the computer-readable medium. The program, when executed by a processor, implements the method described in any embodiments described above.

According to one or more embodiments of the present disclosure, a computer program is provided. The computer program comprises program codes. When a computer runs the computer program, the program codes execute the method described in any embodiments described above.

The above descriptions are merely some preferred embodiments of the present disclosure and illustrations of the applied technical principles. Those skilled in the art should understand that the scope of the invention involved in the embodiments of the present disclosure is not limited to the technical solution formed by the specific combination of the above-mentioned technical features, and should also cover, without departing from the above-mentioned inventive concept, other technical solutions formed by any combination of the above-mentioned technical features or their equivalent features, for example, the technical solution formed by replacing the above features with the technical features with similar functions disclosed in the embodiments of the present disclosure (but not limited to).

What is claimed is:
1. A video generating method, comprising:
acquiring a first video set and an audio material, the first video set comprising a plurality of video materials;
determining a first music point of the audio material according to an amount of the video materials in the first video set, wherein the first music point is used to divide the audio material into a plurality of first music clips, and an amount of the first music clips is same as the amount of the video materials in the first video set;
generating, according to a sorting order of the video materials in the first video set, one video clip for each first music clip in the audio material by respectively using one video material, so as to obtain a first video sequence, wherein the first music clip and the video clip corresponding to each other have a same duration;
adjusting, in response to detecting an editing operation on the video clip in the first video sequence, the video clip in the first video sequence, so as to obtain a second video sequence, wherein the adjusting, in response to detecting an editing operation on the video clip in the first video sequence, the video clip in the first video sequence, so as to obtain a second video sequence further comprises:
rotating, in response to detecting a rotation operation on a sixth video clip in the first video sequence, the sixth video clip to obtain a seventh video clip, and
replacing the sixth video clip with the seventh video clip in the first video sequence to obtain the second video sequence; and splicing together video clips in the second video sequence, and adding the audio material as a video audio track to obtain a composite video.

2. The method according to claim 1, wherein adjusting, in response to detecting the editing operation on the video clip in the first video sequence, the video clip in the first video sequence, so as to obtain the second video sequence, comprises:

adjusting, in response to detecting an adjustment operation on a sorting order of video clips in the first video sequence, the sorting order of the video materials in the first video set according to an adjusted sorting order of the video clips, so as to obtain a second video set; and generating, according to a sorting order of video materials in the second video set, one video clip for each first music clip in the audio material by respectively using one video material, so as to obtain the second video sequence, wherein the first music clip and the video clip corresponding to each other have a same duration.

3. The method according to claim 2, wherein adjusting, in response to detecting the adjustment operation on the sorting order of the video clips in the first video sequence, the sorting order of the video materials in the first video set according to the adjusted sorting order of the video clips, so as to obtain the second video set, comprises:

displaying a first presenting interface of the first video sequence;

moving, in response to detecting the adjustment operation of moving an identifier of a video clip in the first video sequence from a first sorting position to a second sorting position in the first presenting interface, the video clip to the second sorting position, and determining the adjusted sorting order of the video clips; and adjusting the sorting order of the video materials in the first video set according to the adjusted sorting order of the video clips, so as to obtain the second video set.

4. The method according to claim 3, wherein adjusting, in response to detecting the editing operation on the video clip in the first video sequence, the video clip in the first video sequence, so as to obtain the second video sequence, comprises:

deleting, in response to detecting a deletion operation on a first video clip in the first video sequence, a first video material from the first video set to obtain a third video set, wherein the first video clip is generated based on the first video material;

determining a second music point of the audio material according to an amount of video materials in the third video set, wherein the second music point is used to divide the audio material into a plurality of second music clips, and an amount of the second music clips is same as the amount of the video materials in the third video set; and generating, according to a sorting order of the video materials in the third video set, one video clip for each second music clip in the audio material by respectively using one video material, so as to obtain the second video sequence, wherein the second music clip and the video clip corresponding to each other have a same duration.

5. The method according to claim 2, wherein adjusting, in response to detecting the editing operation on the video clip in the first video sequence, the video clip in the first video sequence, so as to obtain the second video sequence, comprises:

deleting, in response to detecting a deletion operation on a first video clip in the first video sequence, a first video material from the first video set to obtain a third video set, wherein the first video clip is generated based on the first video material;

determining a second music point of the audio material according to an amount of video materials in the third video set, wherein the second music point is used to divide the audio material into a plurality of second music clips, and an amount of the second music clips is same as the amount of the video materials in the third video set; and generating, according to a sorting order of the video materials in the third video set, one video clip for each second music clip in the audio material by respectively using one video material, so as to obtain the second video sequence, wherein the second music clip and the video clip corresponding to each other have a same duration.

6. The method according to claim 1, wherein adjusting, in response to detecting the editing operation on the video clip in the first video sequence, the video clip in the first video sequence, so as to obtain the second video sequence, comprises:

deleting, in response to detecting a deletion operation on a first video clip in the first video sequence, a first video material from the first video set to obtain a third video set, wherein the first video clip is generated based on the first video material;

determining a second music point of the audio material according to an amount of video materials in the third video set, wherein the second music point is used to divide the audio material into a plurality of second music clips, and an amount of the second music clips is same as the amount of the video materials in the third video set; and generating, according to a sorting order of the video materials in the third video set, one video clip for each second music clip in the audio material by respectively using one video material, so as to obtain the second video sequence, wherein the second music clip and the video clip corresponding to each other have a same duration.

7. The method according to claim 6, wherein deleting, in response to detecting the deletion operation on the first video clip in the first video sequence, the first video material from the first video set, comprises:

displaying a second presenting interface of the first video sequence;

displaying, in response to detecting a selection operation on the first video clip in the first video sequence in the second presenting interface of the first video sequence, a first clipping operation interface for clipping the video clip from the first video material; and deleting, in response to detecting the deletion operation in the first clipping operation interface, the first video material.

8. The method according to claim 1, wherein adjusting, in response to detecting the editing operation on the video clip in the first video sequence, the video clip in the first video sequence, so as to obtain the second video sequence, comprises:

acquiring, in response to detecting an addition operation on video clips in the first video sequence, a second video material, and adding the second video material to the first video set to obtain a fourth video set;

determining a third music point of the audio material according to an amount of video materials in the fourth video set, wherein the third music point is used to divide the audio material into a plurality of third music clips, and an amount of the third music clips is same as the amount of the video materials in the fourth video set; and generating, according to a sorting order of the video materials in the fourth video set, one video clip for each third music clip in the audio material by respectively using one video material, so as to obtain the second video sequence, wherein the third music clip and the video clip corresponding to each other have a same duration.

9. The method according to claim 8, wherein acquiring, in response to detecting the addition operation on the video clips in the first video sequence, the second video material, and adding the second video material to the first video set to obtain the fourth video set, comprises:

displaying a third presenting interface of the first video sequence;

displaying, in response to detecting the addition operation on the video clips in the first video sequence in the third presenting interface, a browsing interface of the video materials; and acquiring, in response to detecting a selection operation on the second video material in the browsing interface, the second video material, and adding the second video material to the first video set to obtain the fourth video set.

10. The method according to claim 1, wherein the video clip in the first video sequence is cropped from the video material in the first video set in a preset starting point position.

11. The method according to claim 10, wherein adjusting, in response to detecting the editing operation on the video clip in the first video sequence, the video clip in the first video sequence, so as to obtain the second video sequence, comprises:

cropping, in response to detecting an automatic optimization operation on a second video clip in the first video sequence, a plurality of initial video clips from different starting point positions for a music clip corresponding to the second video clip by using a third video material, wherein the music clip corresponding to the second video clip has a same duration as each of the initial video clips, and the second video clip is generated based on the third video material;

respectively performing frame extraction on the plurality of initial video clips, and analyzing quality of the plurality of initial video clips according to images obtained by frame extraction;

selecting a third video clip with highest quality from the plurality of initial video clips; and replacing the second video clip with the third video clip in the first video sequence, so as to obtain the second video sequence.

12. The method according to claim 11, wherein cropping, in response to detecting the automatic optimization operation on the second video clip in the first video sequence, the plurality of initial video clips from different starting point positions for the music clip corresponding to the second video clip by using the third video material, comprises:

displaying a fourth presenting interface of the second video clip in the first video sequence, wherein the fourth presenting interface comprises an automatic optimization control, and the automatic optimization control is used to trigger automatic optimization; and cropping, in response to detecting the automatic optimization operation on the automatic optimization control in the fourth presenting interface, the plurality of initial video clips from different starting point positions for the music clip corresponding to the second video clip by using the third video material.

13. The method according to claim 10, wherein adjusting, in response to detecting the editing operation on the video clip in the first video sequence, the video clip in the first video sequence, so as to obtain the second video sequence, comprises:

determining, in response to detecting a manual optimization operation on a fourth video clip in the first video sequence, a cropping interval selected by the manual optimization operation in the fourth video material;

cropping a fifth video clip from the fourth video material according to the cropping interval; and replacing the fourth video clip with the fifth video clip in the first video sequence, so as to obtain the second video sequence.

14. The method according to claim 13, wherein determining, in response to detecting the manual optimization operation on the fourth video clip in the first video sequence, the cropping interval selected by the manual optimization operation in the fourth video material, comprises:

displaying a fifth presenting interface of the first video sequence;

displaying, in response to detecting a selection operation on the fourth video clip in the fifth presenting interface, a second clipping operation interface for clipping the video clip from the fourth video material; and determining, in response to detecting the selection operation on a clipping interval in the second clipping operation interface, the cropping interval selected in the fourth video material.

15. The method according to claim 1, wherein rotating, in response to detecting the rotation operation on the sixth video clip in the first video sequence, the sixth video clip to obtain the seventh video clip, comprises:

displaying a sixth presenting interface of the first video sequence;

displaying, in response to detecting a selection operation on the sixth video clip in the sixth presenting interface, a rotation operation interface of the sixth video clip; and rotating, in response to detecting the rotation operation on the sixth video clip in the rotation operation interface, the sixth video clip to obtain the seventh video clip.

16. An electronic device, comprising:
one or more processors; and
a storage apparatus, on which one or more programs are stored, wherein, when the one or more programs are executed by the one or more processors, the one or more processors implement operations comprising:

acquiring a first video set and an audio material, the first video set comprising a plurality of video materials;

determining a first music point of the audio material according to an amount of the video materials in the first video set, wherein the audio material is divided into a plurality of first music clips based on the first music point, and an amount of the first music clips is same as the amount of the video materials in the first video set;

generating, according to a sorting order of the video materials in the first video set, one video clip for each first music clip in the audio material by respectively using one video material, so as to obtain a first video sequence, wherein the first music clip and the video clip corresponding to each other have a same duration;

adjusting, in response to detecting an editing operation on the video clip in the first video sequence, the video clip in the first video sequence so as to obtain a second video sequence, wherein the adjusting, in response to detecting an editing operation on the video clip in the first video sequence, the video clip in the first video sequence so as to obtain a second video sequence further comprises:
- rotating, in response to detecting a rotation operation on a sixth video clip in the first video sequence, the sixth video clip to obtain a seventh video clip, and replacing the sixth video clip with the seventh video clip in the first video sequence to obtain the second video sequence; and
- splicing together video clips in the second video sequence and adding the audio material as a video audio track to obtain a composite video.

17. The electronic device of claim 16, wherein the adjusting, in response to detecting an editing operation on the video clip in the first video sequence, the video clip in the first video sequence, so as to obtain a second video sequence further comprises:
- adjusting, in response to detecting an adjustment operation on a sorting order of video clips in the first video sequence, the sorting order of the video materials in the first video set according to an adjusted sorting order of the video clips, so as to obtain a second video set; and
- generating, according to a sorting order of video materials in the second video set, one video clip for each first music clip in the audio material by respectively using one video material, so as to obtain the second video sequence, wherein the first music clip and the video clip corresponding to each other have a same duration.

18. The electronic device of claim 16, wherein the adjusting, in response to detecting an editing operation on the video clip in the first video sequence, the video clip in the first video sequence, so as to obtain a second video sequence further comprises:
- deleting, in response to detecting a deletion operation on a first video clip in the first video sequence, a first video material from the first video set to obtain a third video set, wherein the first video clip is generated based on the first video material;
- determining a second music point of the audio material according to an amount of video materials in the third video set, wherein the second music point is used to divide the audio material into a plurality of second music clips, and an amount of the second music clips is same as the amount of the video materials in the third video set; and
- generating, according to a sorting order of the video materials in the third video set, one video clip for each second music clip in the audio material by respectively using one video material, so as to obtain the second video sequence, wherein the second music clip and the video clip corresponding to each other have a same duration.

19. The electronic device of claim 16, wherein the adjusting, in response to detecting an editing operation on the video clip in the first video sequence, the video clip in the first video sequence, so as to obtain a second video sequence further comprises:
- acquiring, in response to detecting an addition operation on video clips in the first video sequence, a second video material, and adding the second video material to the first video set to obtain a fourth video set;
- determining a third music point of the audio material according to an amount of video materials in the fourth video set, wherein the third music point is used to divide the audio material into a plurality of third music clips, and an amount of the third music clips is same as the amount of the video materials in the fourth video set; and
- generating, according to a sorting order of the video materials in the fourth video set, one video clip for each third music clip in the audio material by respectively using one video material, so as to obtain the second video sequence, wherein the third music clip and the video clip corresponding to each other have a same duration.

20. A non-transitory computer-readable storage medium, on which a computer program is stored, wherein the program, when executed by a processor, implements operations comprising:
- acquiring a first video set and an audio material, the first video set comprising a plurality of video materials;
- determining a first music point of the audio material according to an amount of the video materials in the first video set, wherein the audio material is divided into a plurality of first music clips based on the first music point, and an amount of the first music clips is same as the amount of the video materials in the first video set;
- generating, according to a sorting order of the video materials in the first video set, one video clip for each first music clip in the audio material by respectively using one video material, so as to obtain a first video sequence, wherein the first music clip and the video clip corresponding to each other have a same duration;
- adjusting, in response to detecting an editing operation on the video clip in the first video sequence, the video clip in the first video sequence so as to obtain a second video sequence, wherein the adjusting, in response to detecting an editing operation on the video clip in the first video sequence, the video clip in the first video sequence so as to obtain a second video sequence further comprises:
    - rotating, in response to detecting a rotation operation on a sixth video clip in the first video sequence, the sixth video clip to obtain a seventh video clip, and replacing the sixth video clip with the seventh video clip in the first video sequence to obtain the second video sequence; and
- splicing together video clips in the second video sequence and adding the audio material as a video audio track to obtain a composite video.

* * * * *